United States Patent [19]
O'Connor

[11] Patent Number: 5,793,184
[45] Date of Patent: Aug. 11, 1998

[54] SOLAR POWER SUPPLY UNIT FOR BATTERY OPERATED DEVICES

[75] Inventor: Richard Kevin O'Connor, London, United Kingdom

[73] Assignee: Opcon, Ltd., London, United Kingdom

[21] Appl. No.: 702,437

[22] PCT Filed: Mar. 24, 1995

[86] PCT No.: PCT/GB95/00685

§ 371 Date: Sep. 24, 1996

§ 102(e) Date: Sep. 24, 1996

[87] PCT Pub. No.: WO95/26067

PCT Pub. Date: Sep. 28, 1996

[30] Foreign Application Priority Data

Apr. 20, 1994 [GB] United Kingdom ............... 9407777
Jan. 10, 1995 [GB] United Kingdom ............... 9500409

[51] Int. Cl.$^6$ ............................ H02J 7/35; F16K 13/10
[52] U.S. Cl. ............................ 370/101; 136/251; 323/906
[58] Field of Search ............................ 320/2, 9, 61, 101, 320/21; 136/243, 251, 252, 291, 293; 323/906

[56] References Cited

U.S. PATENT DOCUMENTS

| | | | |
|---|---|---|---|
| 4,274,044 | 6/1981 | Barre | 320/21 |
| 4,563,727 | 1/1986 | Curiel | 136/251 X |
| 4,916,382 | 4/1990 | Kent | 323/906 X |
| 5,504,418 | 4/1996 | Ashley | 323/906 X |
| 5,522,943 | 6/1996 | Spencer et al. | 320/2 X |
| 5,530,335 | 6/1996 | Decker et al. | 320/5 |
| 5,635,816 | 6/1997 | Welsh et al. | 320/21 |

Primary Examiner—Peter S. Wong
Assistant Examiner—Gregory J. Toatley
Attorney, Agent, or Firm—Watson Cole Grindle Watson, PLLC

[57] ABSTRACT

This invention uses low levels of light energy as found within dwellings, or other enclosed but lit spaces, to power a device such as a smoke alarm in place of conventional replaceable batteries. Light incident upon a solar cell array (2) attached to a smoke alarm or other battery powered device is collected and converted to a voltage which is multiplied by the action of one or more DC-DC converter circuits (3, 4 and/or 5) to give rise to a resulting output voltage (6). This voltage is applied via resistor (7) and series device (8) to a rechargeable cell or cells (10) and is limited to a maximum voltage by zener diode (9). If desired, a DC-DC converter can be added at the output of the cell (10) in addition to or in place of the DC-DC converter connected to the solar cell. The converter or converters, the regulating circuits and the cell (10) are all housed in a container which is the same size and shape as a conventional dry cell.

22 Claims, 6 Drawing Sheets

SOLAR POWER SUPPLY UNIT FOR BATTERY OPERATED DEVICES

The present invention relates to adaptation of a battery operated device to allow the device to be supplied with power from a solar cell via circuitry and rechargeable battery.

The problem with many battery operated devices is that the cost of replacement batteries is high and often the battery life is extremely short. This problem can be reduced by mating use of rechargeable cells but this usually involves connecting a charging device to a mains supply.

It has previously been proposed in U.S. Pat. No. 4,686,441 to provide a photoelectric charger including a solar electric panel for generating a charging current for a battery, however, the arrangement is cumbersome and does not provide a practical solution to the problem.

The present invention provides a power supply unit comprising a converter circuit for increasing the output of a photoelectric device and rechargeable cell connected to the converter circuit, the converter circuit and cell being housed in a casing which is the same size and shape as a conventional dry cell.

The power supply unit allows a relatively small area of solar electric panel to be used for the generation of electricity compared to existing solar energy collection methods. Also, the unit allows generation of electricity from low level illumination such as that found within dwellings from artificial light or from the light near to windows. In addition to the above, the smallness of the solar electric panel reduces the cost of the power supply unit. This low cost, and interchange ability with existing dry cell, makes for a device which has applications in very many domestic environments.

The power supply unit can be used to power a wide variety of devices such as smoke alarms, intruder alarms and the like as well as radio and personal stereo players/recorders.

In order that the present invention be more readily understood, an embodiment thereof will now be described by way of example only with reference to the accompanying drawing, in which.

Figure 1:
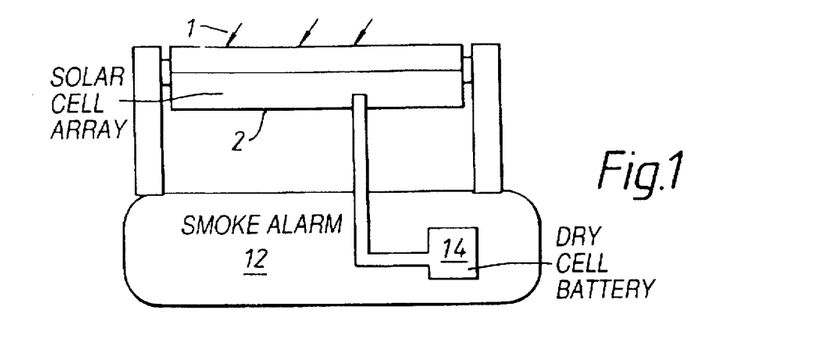
FIG. 1 shows a form view of one embodiment of a battery operated device with a power supply unit according to the present invention.

The power supply unit consists of three basic parts; a solar cell array 2, a DC-DC voltage converter 3, 4, 5, a regulating circuit 7, 8, 9 and a rechargeable battery 10. The solar call 2 array consists of a number of cells connected in series parallel or combination thereof of total area and combined voltage sufficient to give current to operate the voltage step up circuitry using levels of illumination found in normal household dwellings. The cells are aligned to form a single planar surface which has the option to be fixed to the cover of the smoke detector and oriented at a known angle to the horizontal by use of an axel arrangement as shown in FIG. 1.

The solar cell array 2 can be fixed at one angle or adjustable so that light from below and/or the side is equally incident on the solar cell surface. Having an adjustable orientation enables the sun light or household lighting energy to be collected at optimum efficiency. In some cases the array can be positioned separate from the device and the voltage supply run along an extended length of cable or antenna like arm. At the end of the cable from the solar cell array there is a small box 14 of identical shape, size and connections to that of a standard dry cell battery 14 such as a PP3 battery or 2 AA batteries placed side by side. This shape of box allows easy installation of the supply unit into the device 12 by using the same position as normally taken up the dry cell. Inside this box 14 there is a DC-DC converter in the form of one or more voltage step up or doubler circuits 3, 4 and/or 5 connected in cascade such that one voltage step up or doubler feeds the next until sufficient voltage level is achieved to charge the rechargeable battery 10 which is also mounted inside box 14.

Figure 5:
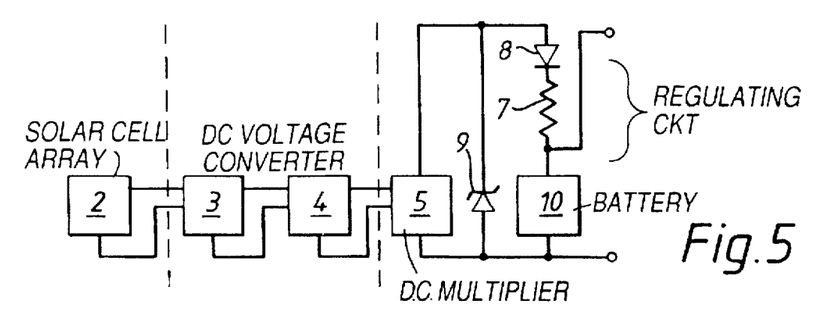
FIG. 5 shows the simplest regulation circuit for low current applications for use in restricted battery size.

As shown in FIG. 5, the current to the rechargeable battery is limited by a regulator circuit comprising a series resistor 7, series diode 8 and voltage limiting zener diode 9 which prevents over charging of the rechargeable battery 10 when high levels of light are incident on the solar cells. A diode is used in series with the voltage step up/doubler circuits to only allow current to flow towards the rechargeable cells.

Figure 6:
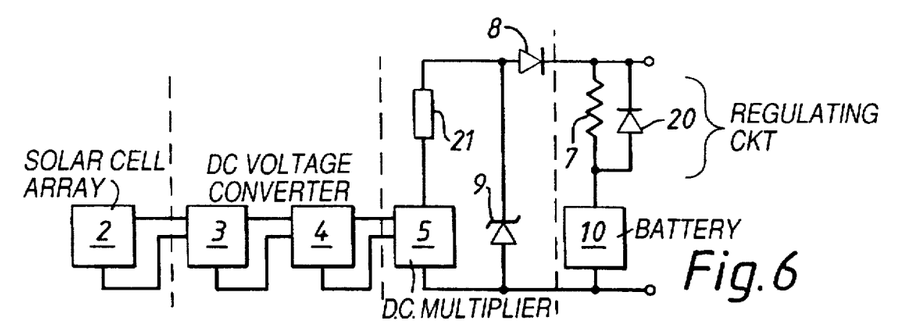
FIG. 6 shows the regulation circuit which reduces the rechargeable battery voltage by placing more step up of voltage between the rechargeable battery and solar powered supply output.

As shown in FIG. 6, in cases when the amount of current generated by the solar cell array and demanded by the electrical device being powered is likely to be large, diode 8 is moved to a position such that current can flow straight from the step up circuit 2,3,4,5 and zener diode 9, through diode 8 to the output. Another diode 20 forward biased from the battery is then placed between the battery and output to prevent high current flowing through the current limiting resistor 7. There may be the option for an extra resistor 21 positioned immediately after the voltage step up circuits to limit the possible maximum current through the zener diode 9.

The current limiting process of resistor -7- also be achieved using a dedicated current limiting device such as a LM334 IC instead of a resistor. In this situation all that is needed is the voltage limiting zener and current limiting device.

Figure 7:
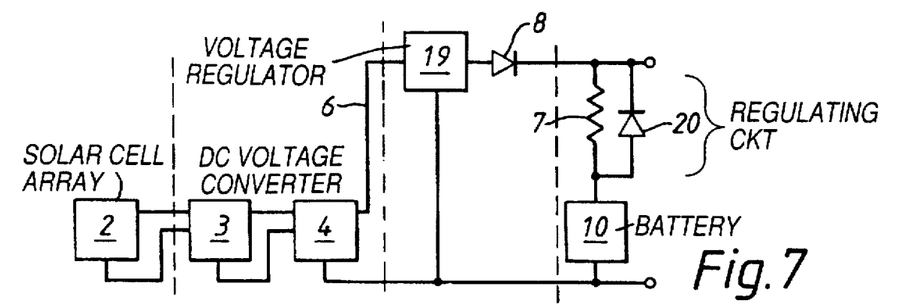
FIG. 7 shows the regulation circuit which allows greater current supply capability when required by virtue of a by-passing connection directly from step up output which is not affected by a current limiting resistor used to control charging current to battery.

See FIG. 7 for a diagram showing the use of a voltage regulator 19 at the end of the step up circuits prior to the resistor 7 and diode 8 which restricts charge current by limiting voltage presented across resistor 7. In this circuit diode 8 is moved to a position such that current can flow straight from the step up circuit 3, 4 through diode 8 to the output. Another diode 20 forward biased from the battery is then placed between the battery and output to prevent high current flowing through the current limiting resistor 7.

The rechargeable cell battery need not necessarily be at the end of the chain of voltage stepup/doubler units. In some circumstances the rechargeable battery 10 voltage can be some multiple below that of the whole circuit output. Having the rechargeable cell voltage at a lower voltage than the circuit output may be advantageous on cost grounds since the battery cost will be reduced. In this case, however, a DC-DC converter or DC-DC converters should be added between the rechargeable cell and the actual device to be powered as indicated in FIG. 8.

Figure 8:
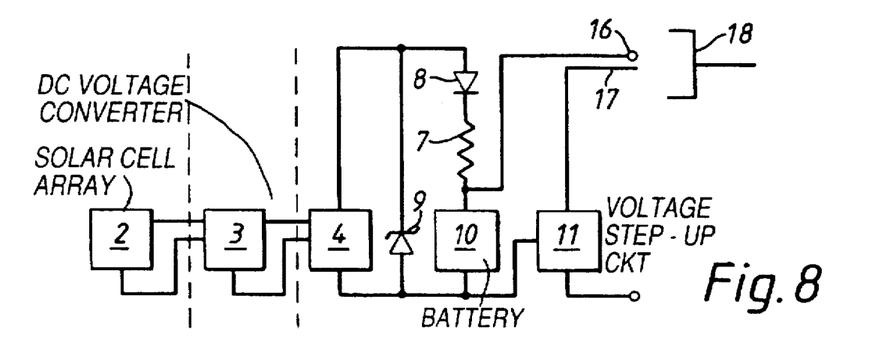
FIG. 8 shows a block diagram of the possible regulating circuit of a high current output capability employing a voltage regulator after the step up circuits, also with by-passing connection from voltage regulator to solar powered supply output not affected by current limiting resistor used to control charge current to battery.

As shown in FIG. 8, another voltage step-up circuit 11 can be fed by the battery 10 and can be mounted inside box 14, allowing the battery voltage to be lower than the output voltage.

Figure 9A:
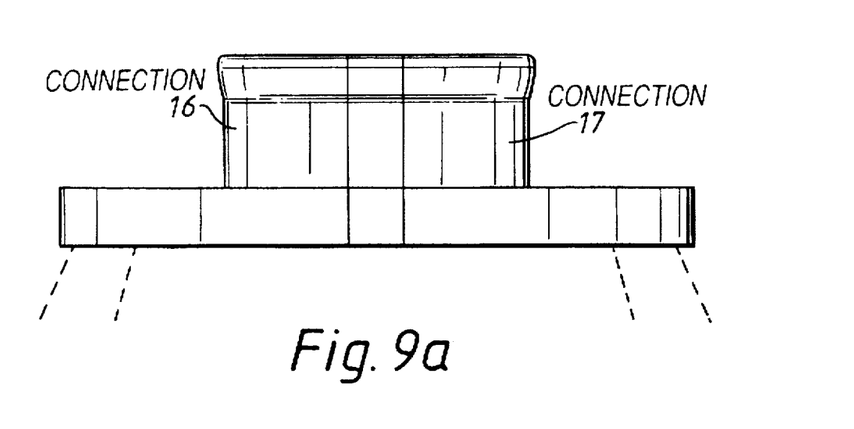
FIGS. 9(A) and (B) show the special terminal which enables use of circuit type shown in FIG. 6.
Figure 9B:
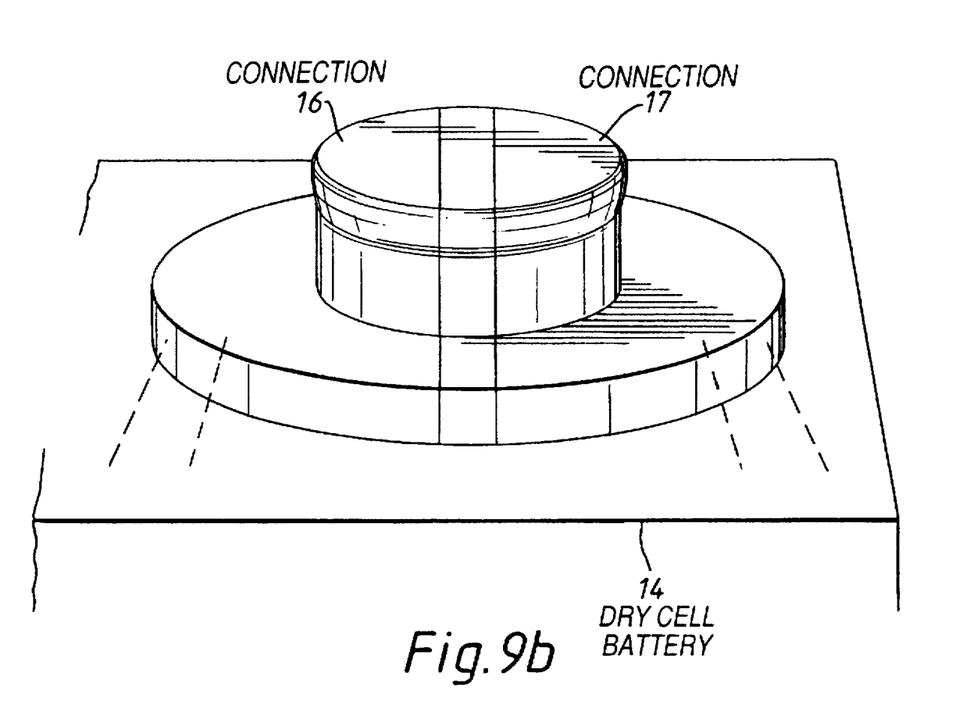

This extra DC-DC converter 11 should be connected from the battery with a special connector which only allows supply to the extra DC-DC converter once the electrical device being powered is actually connected. This action prevents unwanted discharging of the battery whilst the solar adapter is in packaging prior to use and is not being charged from exposure to light. FIGS. 9a,b show how the above is accomplished.

In FIG. 8 both the positive polarity connection 16 from the battery and the connection 17 to the last DC-DC converter come to the solar power supply device output 18 and are only linked together when the positive output is connected. This is because, as shown in FIGS. 9a,b for example, in the case where the box is the same size as a PP3 battery, the positive terminal has an insulating slice 22 between the two positive connections which make up the construction of the PP3 positive terminal so that connections 16 and 17 are only made when the powered device is connected with connection 18. It should be stressed that a similar technique could be used for other types of battery which connect to the battery terminals on the appliance in a fixed orientation.

The use of Dc-Dc converter/s with a solar cell improves the energy conversion from light to electricity for low light levels and small solar cell as compared to the normal method of simply connecting the solar cell voltage output to the rechargeable battery. This is achieved by ensuring the voltage supplied to the battery is always above the battery voltage by the action of the step up circuits even when the actual solar cell output may be below the battery voltage. Consider a solar cell of voltage output V supplying current through resistor R to V supplying current through resistor R to battery to battery voltage Vb, then the Charge Current into the battery I is given by:

$$Current\ I=(V-Vb)/R=(V/R)-(Vb/R)\ \ldots\ 1$$

Using voltage step up between the Solar cell and battery of Gain Factor G requiring extra current is to gain circuit, then the Charge Current into the battery Ig is given by:

$$Current\ Ig=(GV/R)-(Vb/R)-Is\ \ldots\ 2$$

Using equations 1 and 2 and provided that:

$$(G-1)V/R>Is\ \ldots\ 3$$

$$then\ Ig/I>1\ \ldots\ 4$$

which shows the charge current is greater for the circuit using the voltage step up between the Solar cell and battery as opposed to simple connection from Solar cell to battery.

To ensure condition stated above in equation 3 is achieved, special attention should be paid to the voltage and current characteristics (I-V curve) of the Solar cell used with the voltage step up circuit/s optimum design is achieved when the effective Solar cell output impedance, at the chosen illumination, is comparable to the effective input impedance of the combination of step up circuit/s, charge limiting resistor and battery charge internal resistance.

Consider the Efficiency of a Solar cell E in terms of the Voltage output V, Current output I, Area of Solar cell A and amount of Illumination L, then assuming the conditions are not far from its optimum operating point on the (I-V) characteristics, then $$Efficiency\ E=(I\ V)\ /\ (A\ L)\ Watts/m^2/Lux\ \ldots\ 1$$

Consider two Solar Cells of equivalent efficiency E supplying same current to rechargeable batteries, one Solar cell 1 connected directly to the battery, and one Solar cell 2 connected to the battery via a voltage step up circuit of gain factor G.

Using above equation 1 for both Solar cells with Efficiency E and Current I constants k and rearranging gives;

$$(E/I)=k=V1/(A1L1)=V2/(A2L2)\ \ldots\ 2$$

Solar cell 2 needs a reduced voltage output (V2) compared to Solar cell 1 (V1) by virtue of the step up factor G, hence;

$$V2=V1/G\ \ldots\ 3$$

Putting equation 3 into 2 and illuminating V1 gives;

$$(A2L2)/(A1L1)=1/G\ \ldots\ 4$$

Therefore, if the Areas required for the two Solar cells are compared for constant illumination or illumination is compared for the two Solar cells of equal Area, then $$A2/A1=1/G\ constant,\ \ldots\ 5$$

$$L2/L1=1/G\ Aconstant\ \ldots\ 6$$

Considering the same Solar cell delivering the same current to a battery, the two equations 5,6 show that the use of step up voltage circuits between the Solar cell and rechargeable battery allow reduced Area A2 and reduced Illumination L2 compared to the same parameters A1 and L1 for direct connection from Solar cell to battery.

The above analysis assumes the Charge Current I and solar cell Efficiency are equal for both Solar systems compared. Also, the Solar cell short circuit current output capacity Isc at the chosen illuminations, is well in excess of the battery charge current I and well in excess of the current Ig, the step up circuit supply. Another assumption is that the voltage limiting zener diode does not affect the voltage step up output over most operating conditions.

The type of rechargeable cell used is that which exhibits a good voltage output as a function of input current and also can be recharged and discharged a large number of times without any degrade in total capacity. At present this is a lithium-type battery e.g. a lithium-vanadium or manganese dioxide lithium battery. This means for small levels of current the battery quickly settles at a stabilised output voltage.

For some arrangements it is possible to make the solar cell array an integral part of the cover of the device. In this situation there is no possible adjustment of the orientation of the solar cells and, if the device is a smoke detector for example, they must be fixed in such a way to allow light from the side and below to be incident on the cells for efficient collection of light energy. In this case a slightly larger total area of solar cell is used so that in circumstances where light is not equally incident on all the cells this will not adversely affect the solar array current output. When the solar cell is integral with the device the supply connections need not be made via dry cell type connections. The rechargeable cells and voltage doublers can be incorporated into the smoke alarm existing printed circuit board components.

FIG. 1 shows the adapter arrangement fixed on top of a smoke alarm 12 with the supply lead connecting the internally mounted equivalent dry cell 14. Light 1 incident on the solar cell array 2 is collected and converted to a voltage which is increased successively by the action of the voltage step up/ doubler circuits 3, 4 and/or 5 connected in cascade form to give resulting voltage output 6. This voltage is fed via resistor 7 and series diode 8 being limited in maximum voltage by zener diode 9 to one or more rechargeable cells 10. These rechargeable cells can be connected either directly or via another voltage step up/doubler or doublers 11 to the smoke detector.

Figure 2:
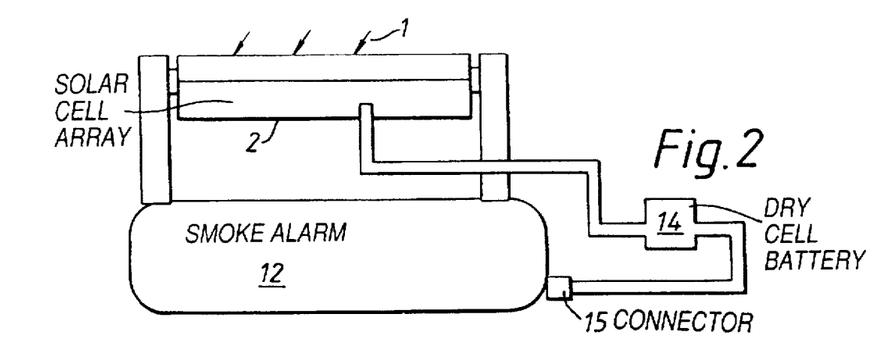
FIG. 2 shows a connection method using an external plug on the outside of the battery operating device.
Figure 3:
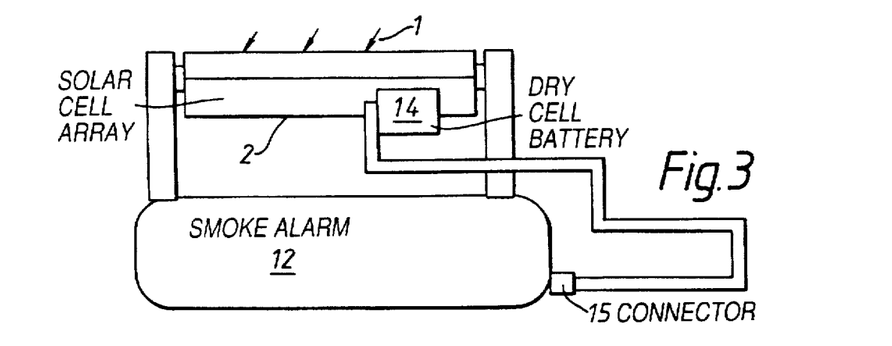
FIG. 3 shows a connection method using an external plug on the outside of the battery operated devices coming from a container comprising solar cell array, step up circuit and rechargeable batteries.

Various modifications can be made to the above described apparatus. For example, in cases where the dry cell shape is small, part or all of the voltage step circuit can be housed in the solar cell construction as shown in FIGS. 2 & 3. Also, the solar cell can be temporarily detached from the rechargeable cell/step up circuit or separate battery/current limit combination when its position is considered inconvenient.

Figure 4:
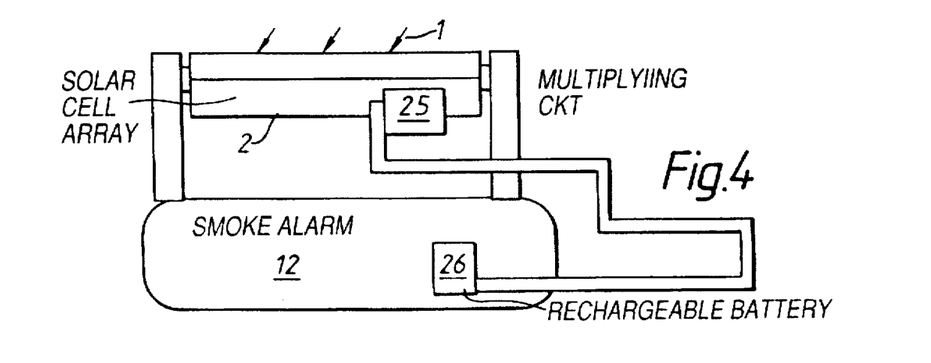
FIG. 4 shows the regulating circuit for low and medium power requirements.

FIG. 4 shows the an embodiment wherein the step up circuits are separated from the rechargeable battery 26 across its positive and negative outputs as shown by dotted vertical lines 7 and 8. This arrangement allows flexibility in charging up a rechargeable battery and then removing the solar cell and voltage step up circuits when not required. This also allows replacement and disposal of the rechargeable battery without the need to throw away DC-DC step up circuitry.

Figure 12:
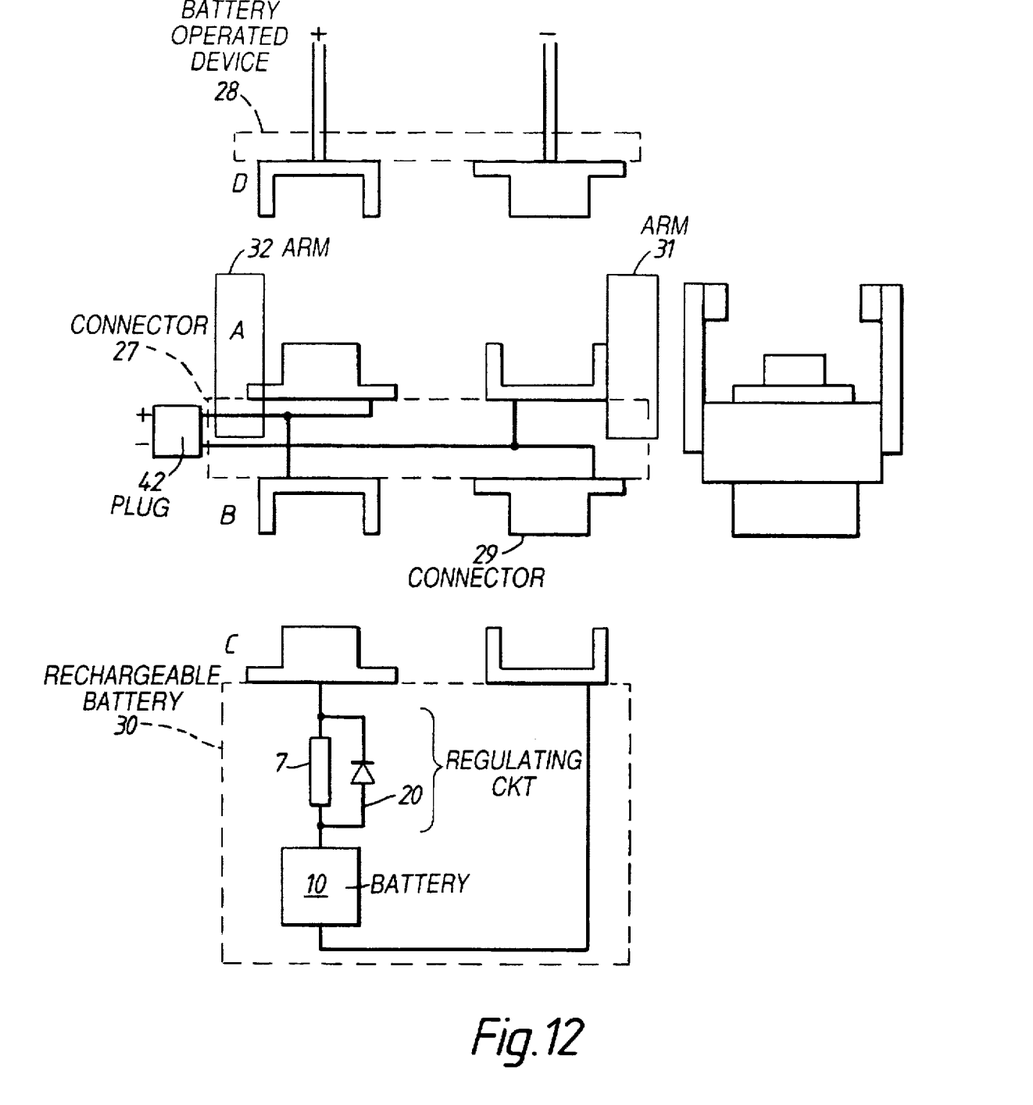
FIG. 12 shows a special connector of another embodiment of the invention.
Figure 13:
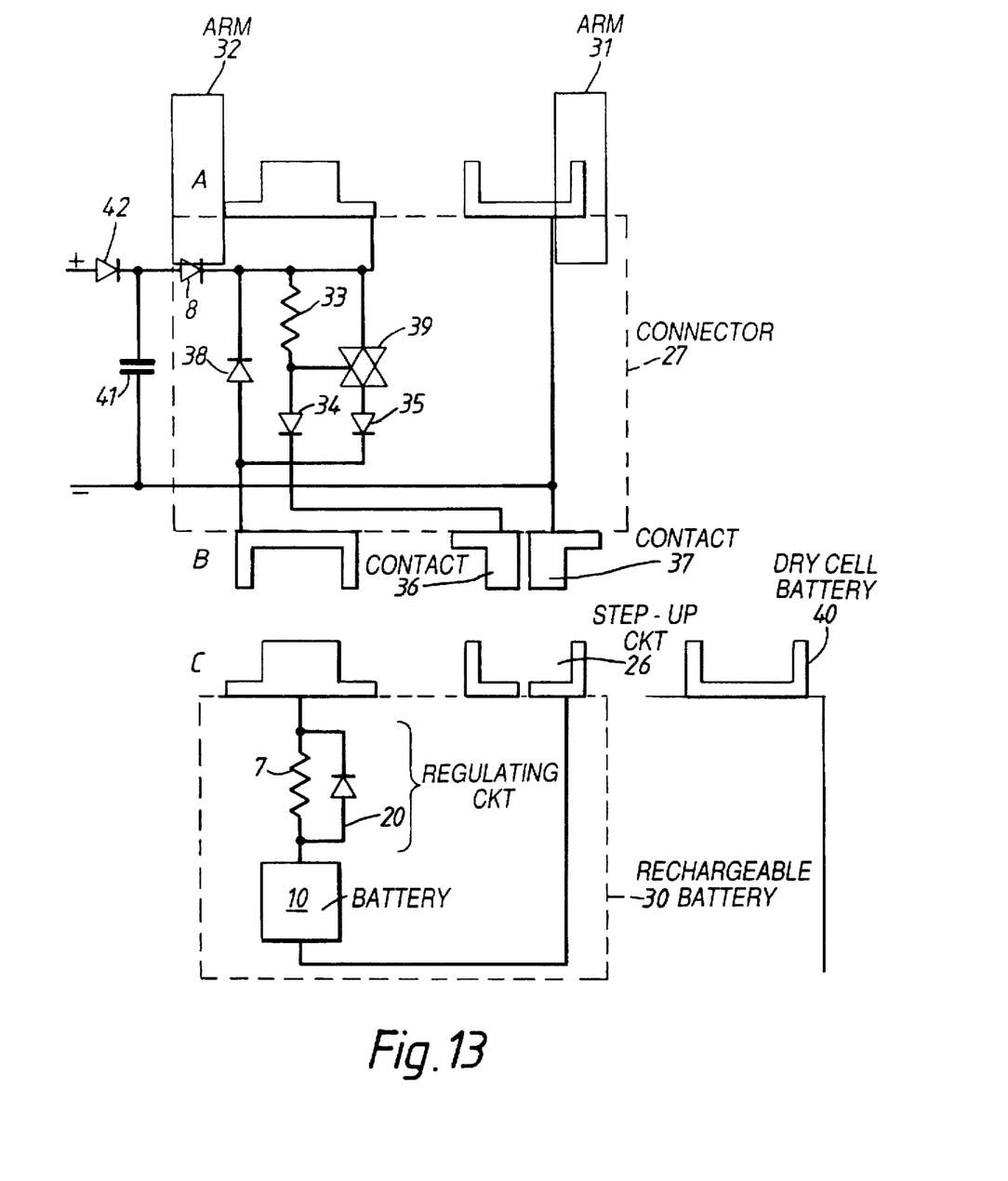
FIG. 13 shows a special connector of a further embodiment of the invention.

In order that the rechargeable battery can be connected to the battery operated device without the charging circuitry present, a connector can be employed between the battery and the device with inputs from the charging circuitry, as shown in FIGS. 12 & 13.

FIG. 12 shows an embodiment of the invention corresponding to a close up of FIG. 4. In this embodiment, a special connector 27 situated between the rechargeable battery 30 and battery operated device 28 can be connected to allow charging of the rechargeable battery 30, at the same time recieving charge from the solar cell and step circuits 25, without interruption of the supply to the battery operated device. The connector 27 is arranged so that the solar supply can be simply disconnected by a plug 42, and allow direct connection of the rechargeable battery and current limit 30 to the battery operated device 28 when solar charging is not required. Two protruding arms 31 and 32 reaching vertically from the connector 27 prevent incorrect connection of the connector 27 to the battery operated device 28 and the rechargeable battery 30, as the arms mechanically interfere with a battery if an attempt is made to connect side A to side C. Side can only be attached to side D.

FIG. 13 shows a further embodiment of the invention whereby a connector 29 situated between the rechargeable battery 30 or ordinary dry cell battery 40 can enable current to a battery operated device 28 either from the rechargeable battery 30 or dry cell battery 40 or solar cell with step up circuits 25. The mechanical construction of the connector has two protruding arms 31 and 32 preventing the side A being accidentally connected to side C of the battery positive and negative terminals. Within the construction of the connector there is a circuit which allows the voltage supply from either the solar cell and step up 26 or rechargeable/dry cell battery to be supplied to the battery operated device. Current from the solar cell step up circuits comes through forward biased diode 8 and current from the rechargeable/dry cell battery comes through forward biazed diode 38 depending on which diode has the greatest forward voltage bias. If there is a greater voltage from the solar cell and step up circuits 25 then current will flow from the rechargeable/dry battery through diode 38. If there has previously been a large amount of solar energy present then a low leakage capacitor 41 which is used to store charge, will temporarily power the battery operated device 28 before current is taken from the rechargeable/dry battery 30 or 40. There is also optionally provided a forward-biased diode 42 to prevent the capacitor discharging through the multiplier circuits while the power supply is not in use.

The above circuit allows current to bypass the diode 38 to recharge a rechargeable battery by detecting the presence of a rechargeable battery by virtue of a specially designed negative battery terminal 26. The special rechargeable battery is constructed with a negative terminal split into two electrically separate contacts 36 and 37. When specially designed rechargeable battery 30 is connected to the connector 27, no connection is made between the negative terminals for the battery operated device, battery and solar power supply and diode 34. As the diode is 34 is not electrically connected to anything, no current can flow through diode 34 and resistor 33. The voltage between resistor 33 and diode 34 is therefore pulled high to the supply voltage, causing a high voltage at the gate/base of switch device 39, which thereby switches on allowing current to flow from the solar cell/step up 25 to the rechargeable battery 30.

When an ordinary dry cell battery 40 is connected to the special connector 27, the half contacts 36 and 37 are both connected to zero, pulling the gate/base voltage of the switching device 39 down and off. This in turn prevents any flow of current bypassing blocking diode 38 into the dry cell battery. Extra Protection diodes 35 and 34 are required to protect the switching device 39 in cases where the battery 30 terminals are temporarily incorrectly contacted to the connector 27 at sides B and C.

This arrangement has the advantage that no charge can be delivered to a dry cell and only a rechargeable battery with split connector will be charged. This allows both rechargeable batteries and dry cell batteries to be used in conjunction with the solar power with the option of standby being provided by a simple dry cell rather than rechargeable cells.

Figure 10:
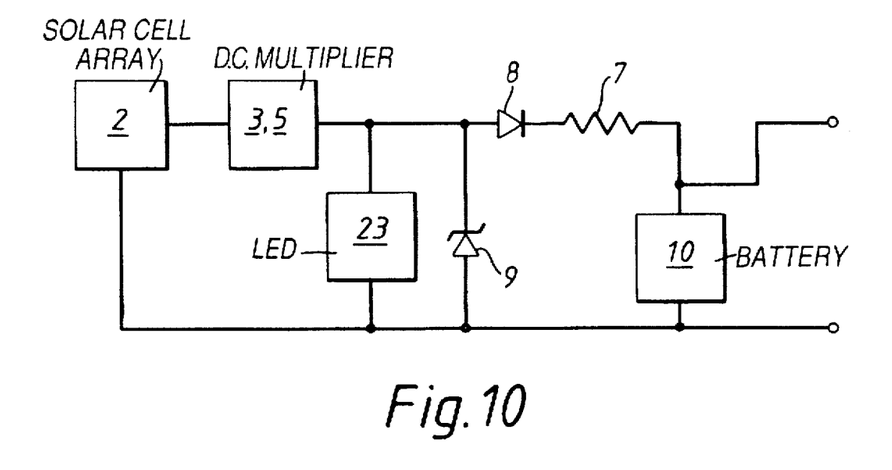
FIG. 10 shows a means to indicate that there is sufficient light to recharge the rechargeable battery by a flashing LED.
Figure 11:
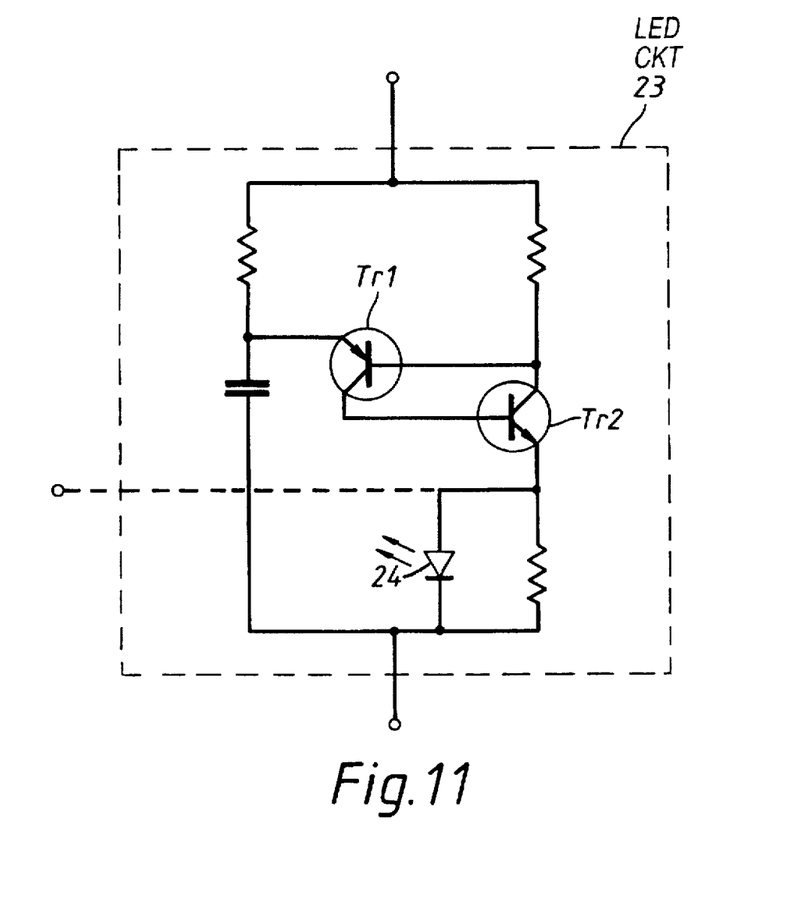
FIG. 11 shows a suitable oscillator circuit which can be used to drive electrical pulses through the LED shown in FIG. 10.

Indication that there is sufficient light to charge the battery can be accomplished by use of a flashing LED 24 placed either in the box 14 containing the rechargeable cells or the solar panel 2. This LED 24 is supplied with an infrequent pulsed voltage from a simple circuit 23 such as that shown in FIG. 11, connected in the position shown in FIG. 10, consisting of two transistors Tr1 and Tr2 moving rapidly in and out of saturation under control of a time constant determined by a capacitor charging up from the supply through a resistor from the output from the step up circuits.

The described arrangement is of particular use where a battery operated device has to be on "stand by" for an extended period and then operate reliably as in the case of a smoke detector, intruder alarm or even a torch. It is also of use in other areas such as in the personal entertainment area where the power supply can be used to power a small radio or a personal stereo device or calculator. All that is important is that the solar cell can be exposed to light for a period of time sufficient to recharge the battery.

In all such uses, the fact that the circuitry and rechargeable battery are housed in a casing which in the same size and shape a a conventional battery such as a PP3 battery or an AA type battery, for example means that no modification to the device is required as long as the wire joining the solar cell to the casing of the power supply can pass under the battery cover of the device.

In cases where there is no external link possible to the dry cell position, because of the enclosed nature of the battery cover design, a slightly different arrangement of the solar powered supply is required. See FIG. 2 and FIG. 3. In this situation the casing 14 containing the batteries, step up circuit and current regulation is made part of the solar cell constructions or lead running from the solar cell to the external supply plug 15 positioned on the battery operated device.

I claim:

1. A power supply for a battery operated device having battery terminals, the power supply comprising:

a solar cell generating an output voltage;

a rechargeable battery;

a voltage multiplying circuit for multiplying the output voltage from the solar cell to a value suitable for recharging said rechargeable battery; and power supply terminals for electrically removably connecting the power supply to the battery terminals of said battery operated device;

said power supply terminals have substantially the same configuration as the terminals of a standard battery and said power supply is able to replace said standard battery;

said power supply further comprising a voltage regulating circuit connected between said multiplying circuit and at least one of the power supply terminals and the rechargeable battery;

said rechargeable battery supplies power to the battery operated device via said electrically removable terminals.

2. A power supply according to claim 1, wherein the voltage multiplying circuit and the voltage regulating circuit are located with said battery between the solar cell and the battery operated device.

3. A power supply according to claim 1, wherein the voltage multiplying circuit and the voltage regulating circuit are located together with the solar cell and said battery.

4. A power supply according to claim 1, wherein the voltage multiplying circuit, voltage regulating circuit and a battery are located in said battery operated device.

5. A power supply according to claim 1, wherein the voltage regulating circuit produces current flow at least from one of the battery to the battery operated device and from the solar cell via the voltage multiplying circuit to the battery operated device, whichever is supplying the greatest voltage.

6. A power supply according to claim 1, comprising a second set of terminals for releasably connecting said battery to said power supply wherein the battery is in a unit mechanically separate from the to her parts of the solar power supply, and wherein the battery comprises terminals releasably connectable to further terminals on the power supply such that the power supply is connectable to at least one of the battery and the battery operated device.

7. A power supply according to claim 6 wherein all the power supply terminals are in a single unit separate from the solar panel.

8. A power supply according to claim 6, wherein mechanical means are provided in proximity to said power supply terminals for preventing said power supply being incorrectly connected to the battery or the battery operated device.

9. A power supply according to claim 6, wherein the terminals on the unit connecting the power supply to the battery operated device has one or more protuberances, and whereby the or any protuberance does not prevent the engagement of said unit and said battery operated device, and whereby the or any protuberance prevents the engagement of the battery terminals and the terminals on the unit designed to engage the battery operated device.

10. A power supply according to claim 1, wherein the regulating circuit comprises a current limiting resistor and diode connected in series with a zener diode connected in parallel to limit the current output from the regulating circuit by limiting the voltage output from the voltage multiplying circuits.

11. A power supply according to claim 1, wherein the regulating circuit comprises a voltage regulator, and a current limiting resistor and diode connected in series between the voltage regulator output and the rechargeable battery.

12. A power supply according to claim 1, wherein current flowing from the power supply to the battery operated device bypasses the regulating circuit.

13. A power supply according to claim 1, wherein the battery is situated before a last multiplier in the multiplier circuit, such that the battery supplies a voltage lower than the output voltage of the power supply.

14. A power supply according to claim 13, wherein the positive terminal of the power supply is in two electrically isolated sections, and wherein the two sections are arranged to both electrically connect to the positive battery terminal of the battery operated device;

whereby the battery is connected to one section of the positive power supply terminal, and an input/output of the multiplier circuit is connected to the other section of the positive power supply terminal, such that no current can flow from the battery when the power supply is not connected to the battery operated device.

15. A power supply according to claim 1, further comprising a second set of terminals for releasably connecting said battery to said power supply said power supply terminals being mounted upon a connector such that the power supply is connectable to the battery and/or the battery operated device, and wherein the battery is in a unit mechanically separate from the voltage multiplying circuit, the battery comprises terminals releasably connectable to at least one of the voltage multiplying circuit and to the battery operated devices; and said battery can be replaced by a dry cell battery.

16. A power supply according to claim 15, wherein a circuit is incorporated in the connector, comprising a forward biased diode from the solar power supply and a forward biased diode from the standard dry cell battery, such that current cannot flow to said standard dry cell battery.

17. A power supply according to claim 15, wherein one of the terminals on said power supply arranged to connect to said battery is split into first and second electrically isolated parts, and the terminal on said rechargeable battery arranged to connect to said terminal is split into first and second electrically isolated parts whereby to give two distinct electrical contacts between said split rechargeable battery terminal and said split power supply terminal.

18. A power supply according to claim 17, wherein said split contacts are arranged to allow current to flow into said rechargeable battery when said power supply is supplying a higher voltage than the battery, and wherein current is prevented from flowing into said dry cell battery via said split terminal on said power supply.

19. A power supply according to claim 1, wherein a large, low leakage capacitor is provided across the power supply output, whereby providing current without the use of a battery for limited periods when the solar cell is not providing sufficient power.

20. A power supply according to claim 1, further comprising at least one light being controlled by a vibrator circuit so that the at least one light is illuminated only when said power supply is supplying sufficient voltage.

21. A power supply according to claim 1, wherein said battery operated device is a smoke detector circuit.

22. A battery operated smoke detector incorporating a power supply having battery terminals, the power supply comprising terminals, the power supply comprising a solar cell and a voltage multiplying circuit for multiplying the output voltage from the solar cell to a value suitable for recharging a rechargeable battery in said power supply, and said power supply being provided with terminals for electrically removably connecting the power supply to the battery terminals of said battery operated device, said power supply terminals have substantially the same configuration as terminals of a standard battery and said power supply is able to replace said standard battery, said power supply further comprising a voltage regulating circuit connected between the multiplying circuit and at least one of the power supply terminals and the rechargeable battery, and said rechargeable battery supplies power to the battery operated device via said electrically removable terminals.

* * * * *